US007969317B2

(12) United States Patent
Oyumi

(10) Patent No.: US 7,969,317 B2
(45) Date of Patent: Jun. 28, 2011

(54) DETECTION APPARATUS AND IMAGE FORMING APPARATUS

(75) Inventor: Masashi Oyumi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 11/746,533

(22) Filed: May 9, 2007

(65) Prior Publication Data

US 2007/0287513 A1 Dec. 13, 2007

(30) Foreign Application Priority Data

Jun. 12, 2006 (JP) ................................ 2006-162216

(51) Int. Cl.

| | |
|---|---|
| ***G08B 17/06*** | (2006.01) |
| ***G08B 13/14*** | (2006.01) |
| ***G08B 23/00*** | (2006.01) |
| ***G05B 11/01*** | (2006.01) |
| ***G08C 19/12*** | (2006.01) |
| ***G03G 15/00*** | (2006.01) |

(52) U.S. Cl. .................. 340/593; 340/12.55; 340/13.24; 340/572.8; 340/520; 399/388; 399/397

(58) Field of Classification Search ............... 340/686.1, 340/10.3, 5.92; 400/58
See application file for complete search history.

(56) References Cited

U.S. PATENT DOCUMENTS

| | | | | |
|---|---|---|---|---|
| 7,292,151 | B2 * | 11/2007 | Ferguson et al. | 340/573.1 |
| 7,482,925 | B2 * | 1/2009 | Hammad et al. | 340/572.1 |
| 2001/0010771 | A1 * | 8/2001 | Nagai et al. | 400/56 |
| 2002/0089678 | A1 * | 7/2002 | Aoto et al. | 358/1.6 |
| 2005/0231370 | A1 * | 10/2005 | Tagato | 340/572.1 |
| 2006/0016897 | A1 * | 1/2006 | Yasuda et al. | 235/492 |
| 2006/0028352 | A1 * | 2/2006 | McNamara et al. | 340/825.49 |
| 2006/0226987 | A1 * | 10/2006 | Nagase | 340/572.1 |
| 2007/0095227 | A1 * | 5/2007 | Belbey et al. | 101/232 |
| 2008/0068140 | A1 * | 3/2008 | Taki et al. | 340/10.51 |

FOREIGN PATENT DOCUMENTS

JP H10-087115 4/1998

* cited by examiner

*Primary Examiner* — Daniel Wu
*Assistant Examiner* — Pameshanand Mahase
(74) *Attorney, Agent, or Firm* — Canon USA Inc. IP Division

(57) ABSTRACT

A detection apparatus includes a casing, a movable member moving from a position outside the casing to a position inside the casing upon contact of a detection object, a radio communication device disposed on the movable member and configured for radio communication with a sending and receiving unit via radio waves, a shielding member for shielding the radio communication between the radio communication device and the sending and receiving unit in a state that the movable member is located within the casing, and a controller for determining the presence of the detection object by determining whether the sending and receiving unit can communicate with the radio communication device.

10 Claims, 9 Drawing Sheets

DETECTION APPARATUS AND IMAGE FORMING APPARATUS

BACKGROUND OF THE INVENTION

1. Field of the Invention

The present invention relates to a detection apparatus for electrically detecting the presence of an object, an image forming apparatus in that the presence of a sheet is detected using the detection apparatus, and a sheet transport apparatus.

2. Description of the Related Art

As disclosed in Japanese Patent Laid-Open No. H10-087115, a photo-interrupter has been used for detecting a sheet being conveyed within an image forming apparatus. A general photo-interrupter is shown in FIG. 8. In a photo-interrupter 501, a light-emitting diode 514 (light emission unit) and a photo-transistor 515 (light receiving unit) are arranged to oppose each other with a space 502 therebetween. The photo-interrupter 501 can electrically detect the presence of a masking object in the space 502 to be output.

An internal circuit of the photo-transistor 515 is shown in FIG. 9. In the photo-interrupter 501, the light-emitting diode 514 and the photo-transistor 515 are arranged. An anode terminal (power supply) 511 is connected to the anode of the light-emitting diode 514. A cathode terminal (GND) 513 is connected to the cathode of the light-emitting diode 514 and the emitter of the photo-transistor 515. A collector terminal (detection output) 512 is connected to the collector of the photo-transistor 515.

When the light emitted from the light-emitting diode 514 enters the photo-transistor 515, the photo-transistor 515 is turned on to reduce the corrector terminal to an L-level. When the light emitted from the light-emitting diode 514 is shielded, the photo-transistor 515 is turned off so that the collector terminal becomes an H-level due to the pulling-up of a circuit connected thereto. In such a manner, for operating the photo-interrupter for electrically outputting the detection of the presence of the masking object in the space 502, the connection with three wires is necessary.

FIGS. 10A and 10B illustrate that the photo-interrupter is used for detecting a sheet together with other mechanical members in an image forming apparatus. A mechanical flag 503 is rotatable about a rigid shaft 505. In FIG. 10A showing the absence of a sheet, one end of the mechanical flag 503 is raised by a spring 504. In this case, since the light in the space 502 is not shielded, the output of the photo-interrupter 501 becomes the L-level.

In FIG. 10B showing the presence of a sheet, the mechanical flag 503 is pushed down into the space 502 by a sheet 109, so that the light of the photo-interrupter 501 is shielded and the output of the photo-interrupter 501 becomes the H-level.

FIG. 11 is a control block diagram illustrating when the photo-interrupter is used for detecting a sheet being conveyed in an image forming apparatus, and includes a control unit 121 having a CPU and an I/O port for control, a driver unit 122 for executing various operations based on the control of the control unit 121, and photo-interrupters 123*a*-123*z*. For actuating the interrupters 123, each interrupter is connected to the control unit 121 or the driver unit 122 with three wires for each.

Since a number of the interrupters 123 are used in the image forming apparatus, it is necessary to connect the many interrupters 123 to the control unit 121 and the driver unit 122 with wires. Thus, it is required to provide, in the image forming apparatus, a number of wires long enough to reach the interrupters 123, which are arranged all over the image forming apparatus, from the control unit 121.

The existence of many long wires increases the possibility of generating the contact failure of connectors and the wire breaking, causing troubles. With increasing number of wires, the cost of the wire itself and the cost for wiring the image forming apparatus are increased.

SUMMARY OF THE INVENTION

The present invention provides a detection apparatus capable of reducing the cost of wire itself and the cost for wiring an apparatus as well as of fundamentally eliminating the contact failure of connectors and the wire breaking, and an image forming apparatus.

According to an aspect of the present invention, a detection apparatus includes a casing, a movable member movable from a position outside the casing to a position inside the casing upon contact of a detection object, a radio communication device disposed on the movable member and configured for radio communication with a sending and receiving unit via radio waves, a shielding member capable of shielding the radio communication between the radio communication device and the sending and receiving unit in a state that the movable member is located within the casing, and a controller capable of determining the presence of the detection object by determining whether the sending and receiving unit can communicate with the radio communication device.

According to another aspect of the present invention, an image forming apparatus includes an image forming unit capable of forming images on a sheet, a casing, a movable member movable from a position outside the casing to a position inside the casing upon contact of the sheet, a radio communication device disposed on the movable member and configured for radio communication with a sending and receiving unit via radio waves, a shielding member capable of shielding the radio communication between the radio communication device and the sending and receiving unit in a state that the movable member is located within the casing, and a controller capable of determining the presence of the sheet by determining whether the sending and receiving unit can communicate with the radio communication device.

Further features of the present invention will become apparent from the following description of exemplary embodiments with reference to the attached drawings.

DESCRIPTION OF THE EMBODIMENTS

Exemplary embodiments of the present invention will be described below in detailed exemplification with reference to the drawings. However, sizes, materials, shapes, and relative arrangements of components described in the embodiments do not limit the scope of the invention unless otherwise specifically described.

First Embodiment

Figure 1:
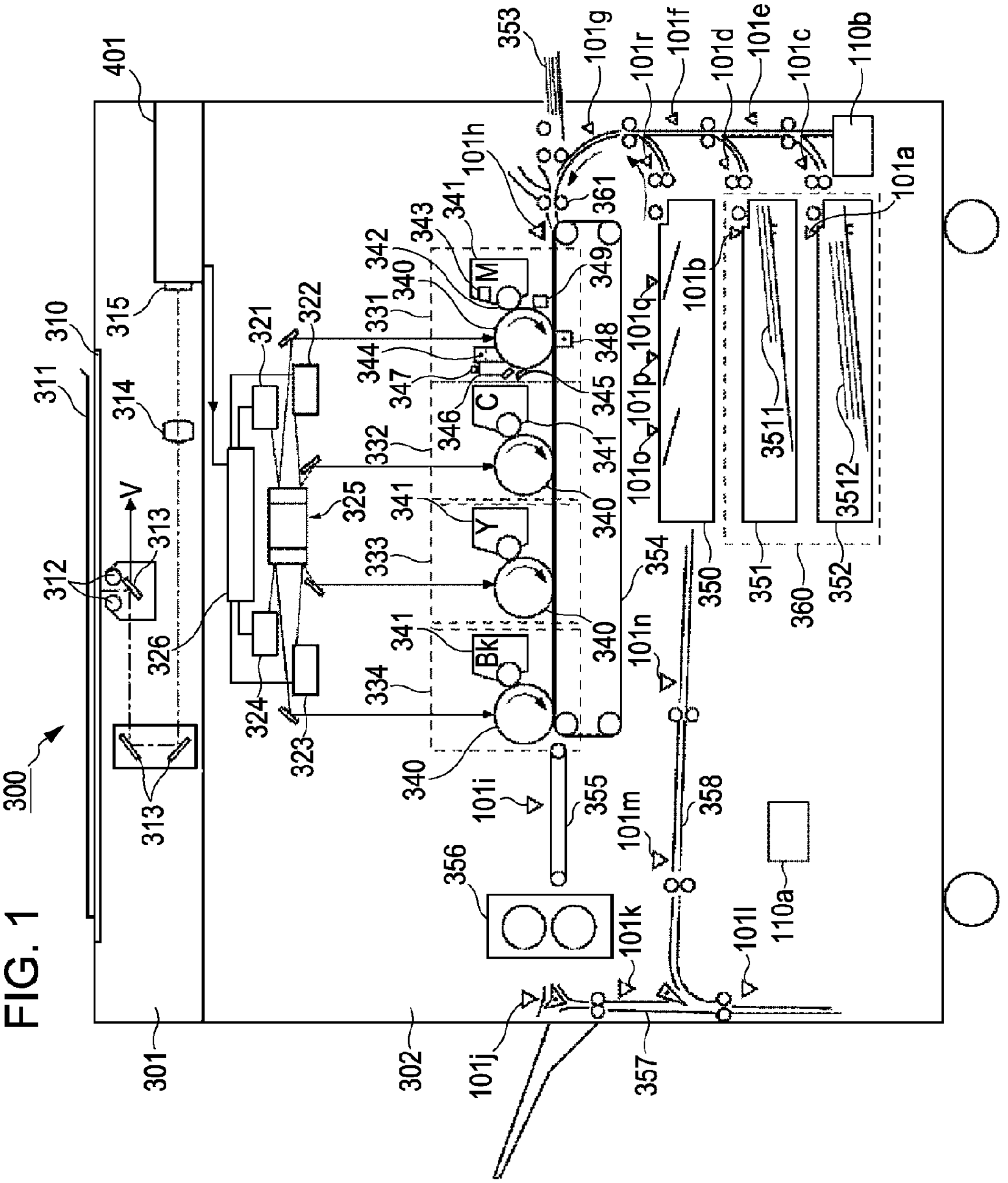
FIG. 1 is a configuration drawing of an image forming apparatus.

First, a first exemplary embodiment of the present invention will be described. An image forming apparatus 300, as shown in FIG. 1, includes a reader unit 301 and a printer unit 302.

A document placed between a document stand (platen) 310 and a document pressure plate 311 is irradiated with light from a lamp 312 and is scanned therewith in arrow V direction. The reflected image from the document is focused on a CCD 315 having three-color filters R, G, and B via a mirror group 313 and a lens 314 and is photo-electrically converted into color signals R, G, and B by the CCD 315. An image processor 401 produces output image data C, M, Y, and K by performing predetermined image processing on the image signals from the CCD 315 so as to be output to the printer unit 302.

A printer control unit 326 controls image forming and driving. A photosensitive drum is scanned with a laser beam by a polygon scanner 325.

The printer control unit 326 performs image conversion with predetermined γ correction on image data. In accordance with the γ-corrected image data, the photo-sensitive drum for each color is scanned with a laser beam from laser devices 321 to 324, which are independently driven.

An image forming unit M (magenta) 331, an image forming unit C (cyan) 332, an image forming unit Y (yellow) 333, and an image forming unit K (black) 334 all have the same configuration. Since the image forming unit for each color is the same, the image forming unit 331 for magenta (M) will be described as a representative. In the image forming unit 331, latent images are formed on a photo-sensitive drum 340 with an exposure of the laser beam. A developing unit 341 develops toner images on the photo-sensitive drum 340. To a developing sleeve 342 in the developing unit 341, a developing bias is applied to develop the toner images. A toner density sensor 343 detects a toner density based on the reflected light from the toner on the developing sleeve 342.

A primary charger 344 charges the photo-sensitive drum 340 in a desired potential. A cleaner 345 cleans the surface of the photo-sensitive drum 340, from which images have been transferred. An auxiliary discharging unit 346 neutralizes the surface cleaned by the cleaner 345 of the photo-sensitive drum 340 so as to have preferable charging in the charging by the primary charger 344.

A pre-exposure lamp 347 erases the residual electric charge on the photo-sensitive drum 340. A transfer charger 348 transfers the toner images on the photo-sensitive drum 340 onto a sheet by discharging from the inside of a transfer belt 354. A developing density sensor 349 detects the reflected light from the toner images formed on the photo-sensitive drum 340.

Paper sheets 3511 and 3512 are fed from sheet storage means 351 and 352, respectively. A register roller 361 determines the timing of conveying a sheet to the image forming unit by once stopping the sheet. After making the conveying timing by the register roller 361, the sheet is fed onto the transfer belt 354. By transferring the toner images formed on the photo-sensitive drum 340 onto the sheet conveyed by the transfer belt 354, magenta images are formed on the sheet.

By applying this electrophotographic process to developing stations C, Y, and K, color images corresponding to the document are formed on the sheet.

The sheet having the images formed thereon passes through a pre-fixing conveyer 355 so that the toner images are heated and fixed on the sheet by a fixing unit 356 to be output as the images on the sheet. For reverse face discharging by turning over the image plane, the sheet is conveyed to a reverse conveying path 357 and discharged after being inverted in the reverse conveying path 357.

In a duplex printing mode, the sheet having fixed images is conveyed to a refeeding path 358 from the reverse conveying path 357 and is fed to a refeeding device 350 as a sheet for image forming on the other side. Paper sheets can also be fed via a manual sheet feeder 353. A sheet storage 360 includes the sheet storage means 351 and 352.

Sheet detection sensors 101*a* to 101*r*, including sensors built in an RFID (radio frequency identification) tag, are arranged at various positions along the conveying path. Sheet detection sensors 110*a* and 110*b* are sending and receiving units of the RFID arranged in the image forming apparatus 300. In the RFID detection sensors 101*a* to 101*r*, the communication state of the RFID tag is switched depending on the presence of a sheet being conveyed. The communication state of the RFID tag is received by the sending and receiving unit 110, and the sheet position is detected based on the sensor information so as to control the sheet conveying. This configuration will be described later in detail.

Figure 2:
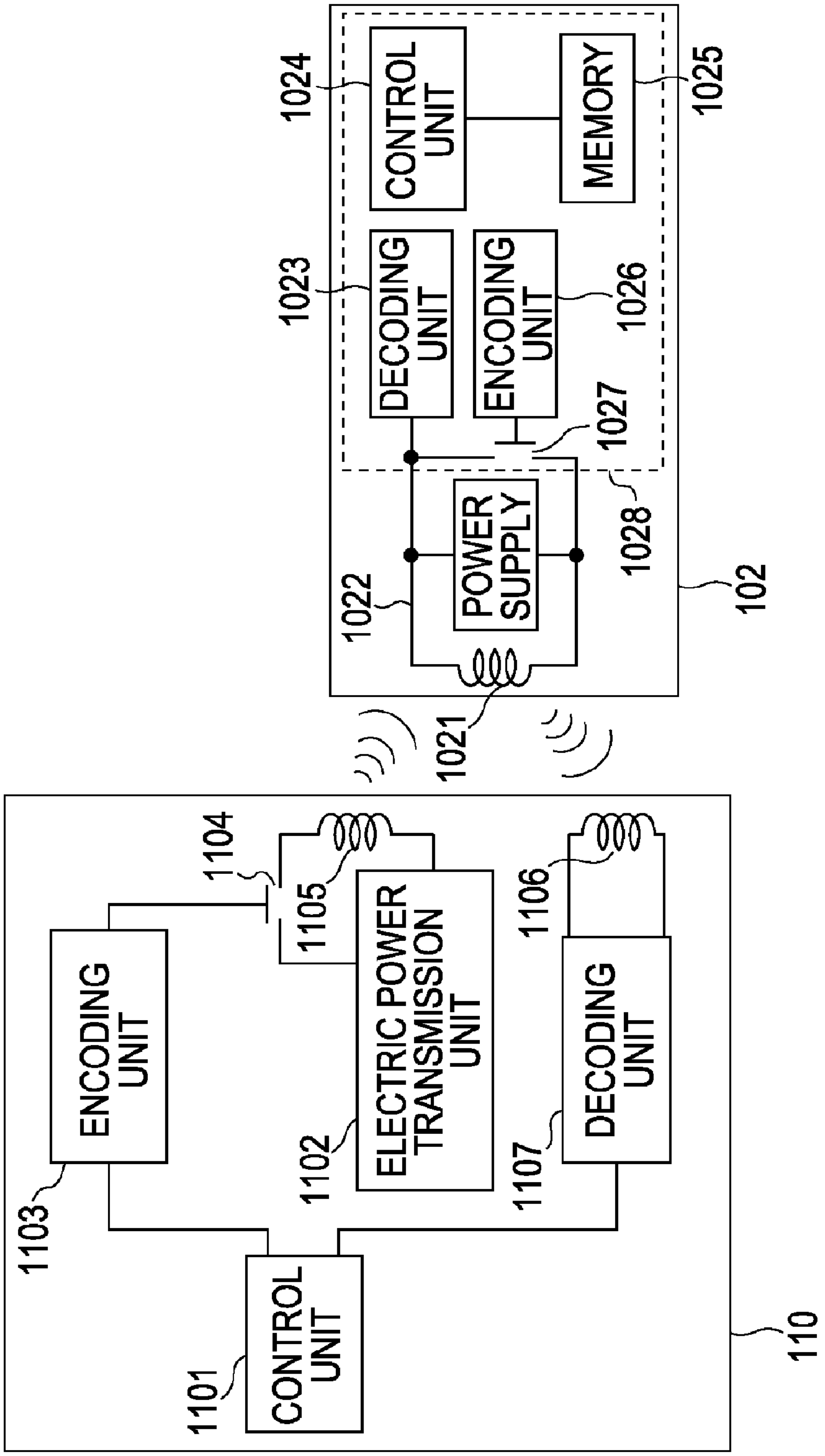
FIG. 2 is a block diagram of an RFID tag and a sending and receiving unit.

The operation of the RFID tag will be described next with reference to FIG. 2. The sending and receiving unit 110 includes a control unit 1101, an electric power transmission unit 1102, an encoding unit 1103, a switching unit 1104, an antenna 1105, a receiving antenna 1106, and a decoding unit 1107.

The RFID tag 102 includes an antenna 1021, a power supply 1022, and an IC chip 1028. The IC chip 1028 includes a decoding unit 1023, a control unit 1024, a memory 1025, an encoding unit 1026, and a switching unit 1027.

The sending and receiving data by the RFID tag 102 will be described below. When electric current flows through the antenna 1105 on the basis of the signal produced in the electric power transmission unit 1102 of the sending and receiving unit 110, electromagnetic waves are radiated in the air. When the electromagnetic waves radiated in the antenna 1021 of the RFID tag 102 are induced, an induced electromotive force is produced due to a flux of magnetic induction in the power supply 1022. The RFID tag 102 activates the IC chip 1028 by the induced electromotive force produced in the power supply 1022.

The electromagnetic waves radiated by the sending and receiving unit 110 for power supply are also used as carrier waves for transmitting data. The encoding unit 1103 encodes data based on the control from the control unit 1101. The switching unit 1104 modulates the carrier waves by switching the encoded data. Then, the data is transmitted to the RFID tag 102 by the antenna 1105.

The RFID tag 102 receives the data by decoding the encoded data from the modulated carrier waves in the decoding unit 1023. The control unit 1024 of the RFID tag 102 reads out the data from the memory 1025 on the basis of the received data. The encoding unit 1026 encodes the data based on the control from the control unit 1024. The switching unit 1027 modulates the carrier waves by switching the data encoded by the encoding unit 1026. Then, the data is transmitted to the sending and receiving unit 110 by the antenna

1021. The sending and receiving unit 110 receives the data by decoding the encoded data received in the receiving antenna 1106 and modulated carrier waves in the decoding unit 1107.

Figure 3A:
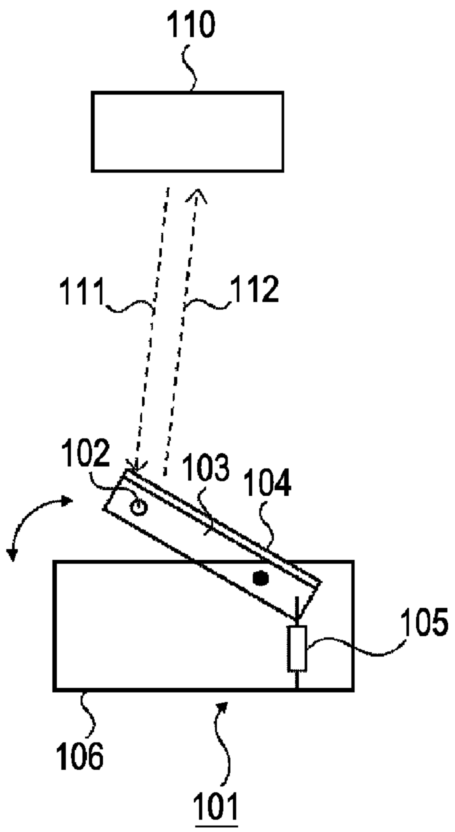
FIGS. 3A and 3B are views of an RFID detection sensor.
Figure 3B:
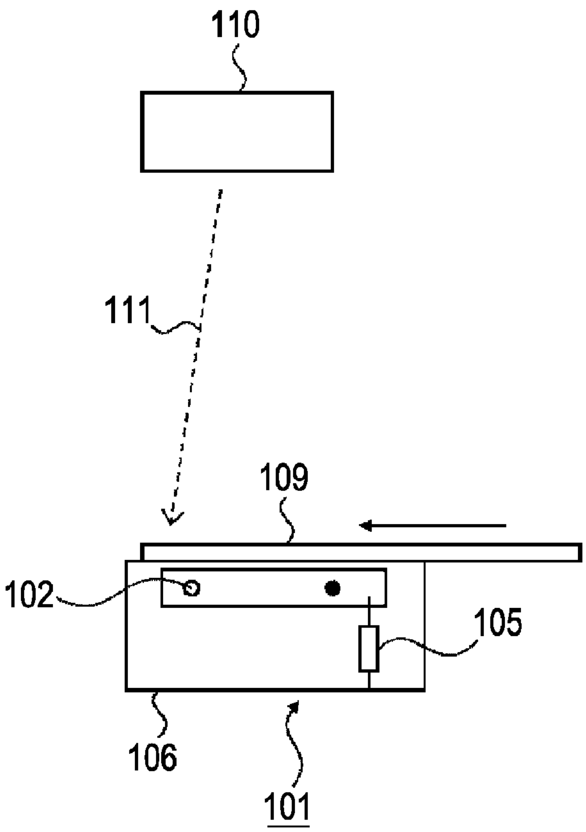
Figure 4A:
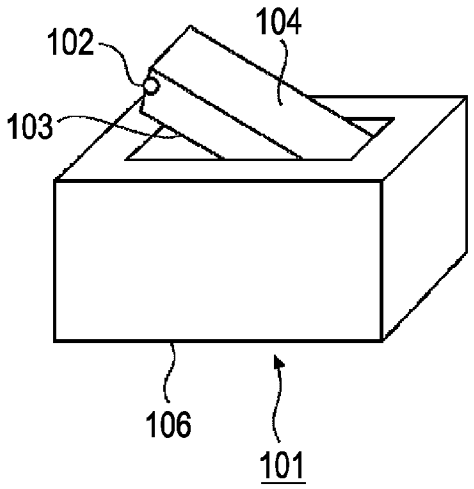
FIGS. 4A and 4B are perspective views of the RFID detection sensor.
Figure 4B:
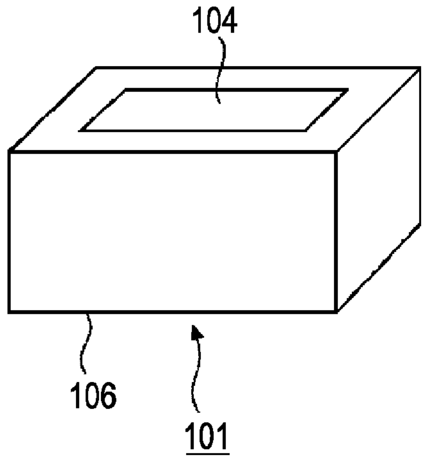

FIGS. 3A and 3B are side views of the sheet detection sensor; FIGS. 4A and 4B are perspective views of the sheet detection sensor; FIGS. 3A and 4A show a state that a detection object (sheet, etc.) is not detected; and FIGS. 3B and 4B show a state that the detection object is detected.

A sheet detection sensor (RFID detection sensor) 101 includes an RFID. The sheet detection sensor 101 includes an RFID tag (radio communication device) 102, a mechanical flag (movable member) 103, an electromagnetic shielding member 104 arranged on the mechanical flag 103, and a sensor casing 106 made of the electromagnetic shielding member. The electromagnetic shielding member is made of a metal for shielding electromagnetic waves. A spring 105 is arranged between the mechanical flag 103 and the sensor casing 106.

The sending and receiving unit 110 communicates with the RFID tag 102 via radio waves, including receiving waves 112 transmitted from the RFID tag 102 to be received by the sending and receiving unit 110.

In the state of FIGS. 3A and 4A, the end of the mechanical flag 103, at which no RFID tag 102 is provided, is pulled toward the sensor casing 106 by the spring 105. Thus, the RFID tag 102 is exposed from the sensor casing 106.

In this state, the RFID tag 102 is exposed so that the RFID tag 102 can communicate with the sending and receiving unit 110 by receiving sending waves 111 therefrom and sending receiving waves 112 thereto.

In the state of FIGS. 3B and 4B, the mechanical flag 103 is pushed into the sensor casing 106 by a detection object 109, and the RFID tag 102 is electromagnetically shielded by the electromagnetic shielding members 104 provided on the surfaces of the sensor casing 106 and the mechanical flag 103. In this state, since the RFID tag 102 cannot receive the sending waves 111, the RFID tag 102 cannot communicate with the sending and receiving unit 110.

Figure 5:
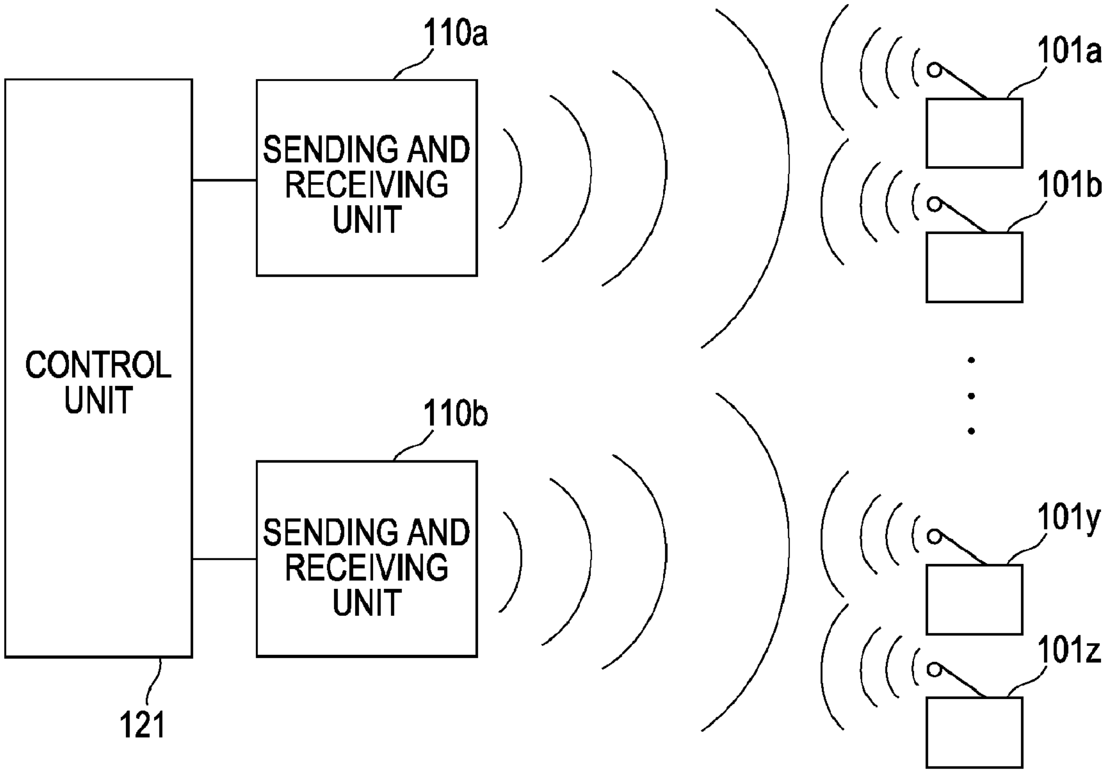
FIG. 5 is a control block diagram.

FIG. 5 is a control block diagram according to the first embodiment. The control unit 121 houses a CPU for controlling. Sending and receiving units 110*a* and 110*b* are connected to the control unit 121 and send signals that can be detected by RFID detection sensors 101*a*-101*z*.

In the image forming apparatus 300, a number of the RFID detection sensors 101 are provided; however, wires between the sending and receiving unit 110 and the RFID detection sensors 101 are unnecessary. The information from each sensor received by the sending and receiving unit 110 is informed to the control unit 121.

The information stored in the RFID tag 102 of each of the RFID detection sensors 101 to be returned to the sending and receiving unit 110 as a reply includes a serial number of the specific image forming apparatus 300 and a sensor number allocated to every sensor position in the image forming apparatus 300. The control unit 121 determines from the information received from the RFID detection sensor 101 which RFID detection sensor in the image forming apparatus 300 detects the object.

The sending and receiving timing by the sending and receiving units 110*a* and 110*b* is switched by time sharing. Thus, if one of the sending and receiving units cannot communicate with one RFID detection sensor due to the long distance and when the other can communicate therewith, the determination whether the RFID detection sensor detects the object can be made.

The communication with the entire RFID detection sensors 101 in the initial state can be confirmed by making the mechanical flag 103 of each of the RFID detection sensors 101 arranged in the image forming apparatus 300 have an initial state capable of RFID communicating. Thus, the initial defect in the RFID detection sensors 101 can be detected. If a defective RFID detection sensor is detected, the control unit 121 prompts a user to confirm the defect by displaying a warning on an operation panel (not shown), for example, the control unit 121 displays the position of the defective RFID detection sensor and a message prompting the user to replace the sensor on the operation panel.

There are various ways for storing serial apparatus numbers and sensor numbers to be stored in the RFID tag 102 of each of the RFID detection sensors 101. For example, in the manufacturing process, after a series of apparatus numbers and sensor numbers are stored in each of the RFID detection sensors 101 in advance, each RFID detection sensor 101 may be mounted on the apparatus corresponding to the stored apparatus number. Alternatively, after each of the RFID detection sensors 101 is assembled in a unit, the predetermined apparatus number and sensor number may be stored.

As described above, according to the embodiment, by providing a mode capable of communicating between the RFID tag 102 and the sending and receiving unit 110 and another mode incapable of communicating between the RFID tag 102 and the sending and receiving unit 110, the control unit 121 can detect the state of the RFID detection sensors 101. For example, the presence of a detection object (sheet) can be detected based on whether the sending and receiving unit 110 can receive a signal from the RFID detection sensors 101.

According to the embodiment, the sheet presence detection has been exemplified; however, the detection object is not limited to the sheet presence. The sending unit and the receiving unit have been integrated as the sending and receiving unit 110; however, they may also be separated.

Second Embodiment

Figure 6A:
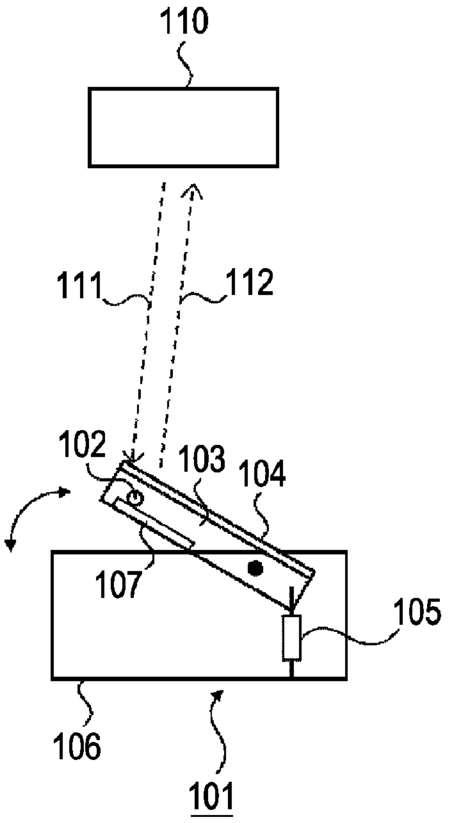
FIGS. 6A and 6B are views of an RFID detection sensor according to a second embodiment.
Figure 6B:
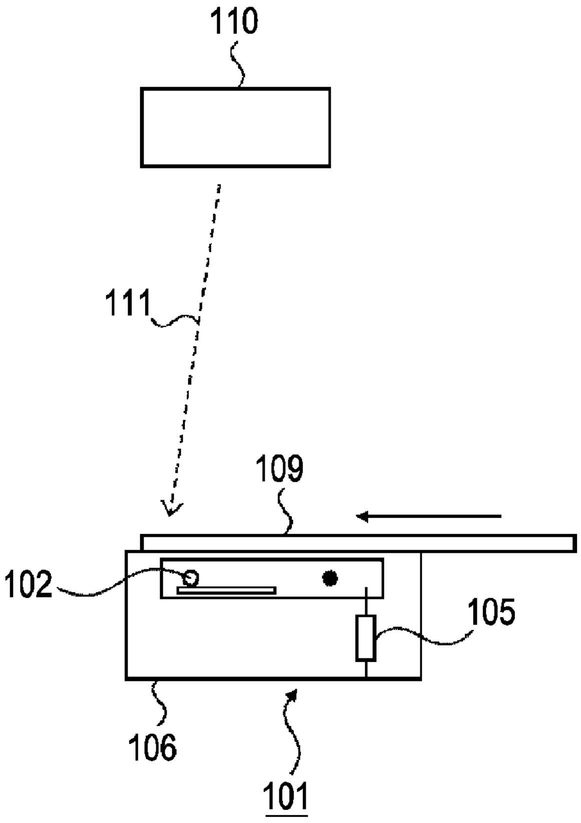

FIGS. 6A and 6B are side views of an RFID detection sensor according to a second embodiment; FIG. 6A shows the exterior during non-detecting an object; and FIG. 6B shows the exterior during detecting the object. An antenna 107 is connected to the RFID tag 102. Other components are the same as shown in FIGS. 3A and 3B and described above.

The antenna 107 is attached to the mechanical flag 103, so that in the state of FIG. 6A, the antenna 107 is exposed from the sensor casing 106 due to the opened state of the mechanical flag 103. In this state, because of the exposure of the RFID tag 102 and the antenna 107, the RFID tag 102 can receive sending waves 111 and return receiving waves 112 to the sending and receiving unit 110 so as to establish the communication.

In the state of FIG. 6B, the mechanical flag 103 is pushed into the sensor casing 106 by a detection object 109, and the RFID tag 102 and the antenna 107 are electromagnetically shielded with the electromagnetic shielding members 104 provided on the surfaces of the sensor casing 106 and the mechanical flag 103. In this state, the RFID tag 102 cannot receive the sending waves 111, disabling the communication with the sending and receiving unit 110.

As described in this embodiment, providing the antenna 107 enables the receiver sensitivity and the sending capacity of the RFID tag 102 to be improved as well as the much more secure electromagnetic shielding due to the shielding of the antenna 107 as well during the shielding.

Third Embodiment

According to a third embodiment, there is provided a mode in that during replacing an RFID detection sensor, information of an apparatus specific number and a sensor number is sent from the sending and receiving unit 110 so as to write the information on a new RFID detection sensor.

Figure 7:
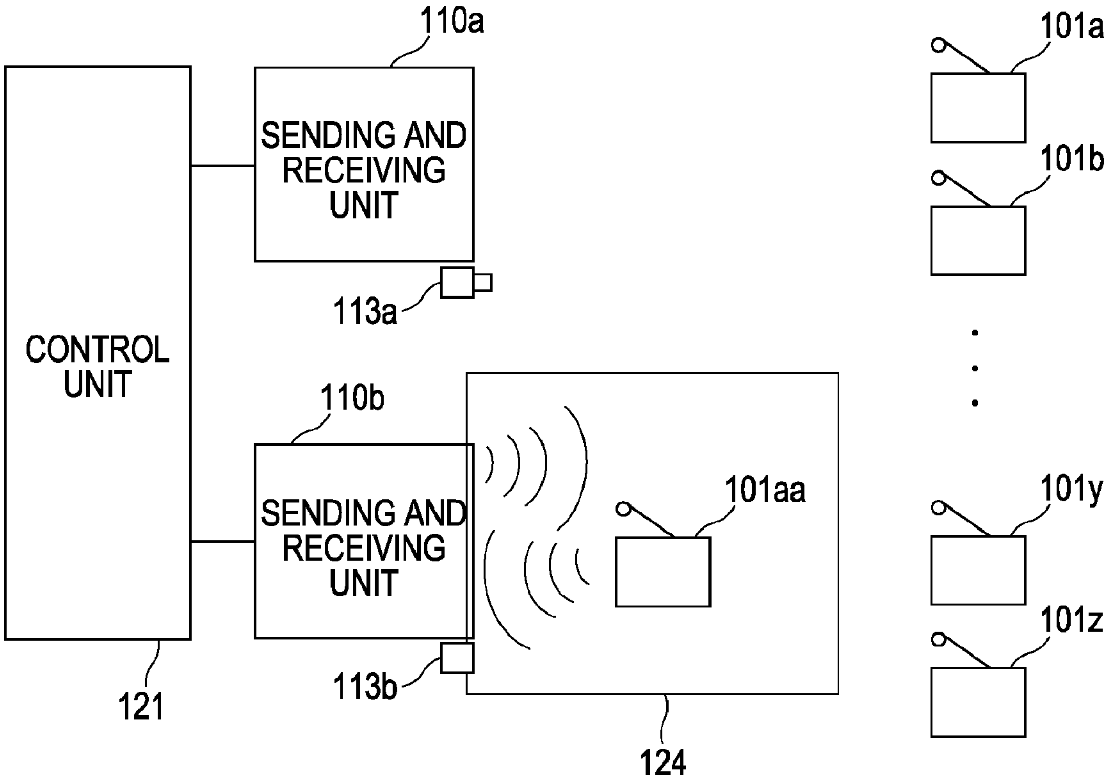
FIG. 7 is a block diagram of an RFID tag and a sending and receiving unit according to a third embodiment.
Figure 8:
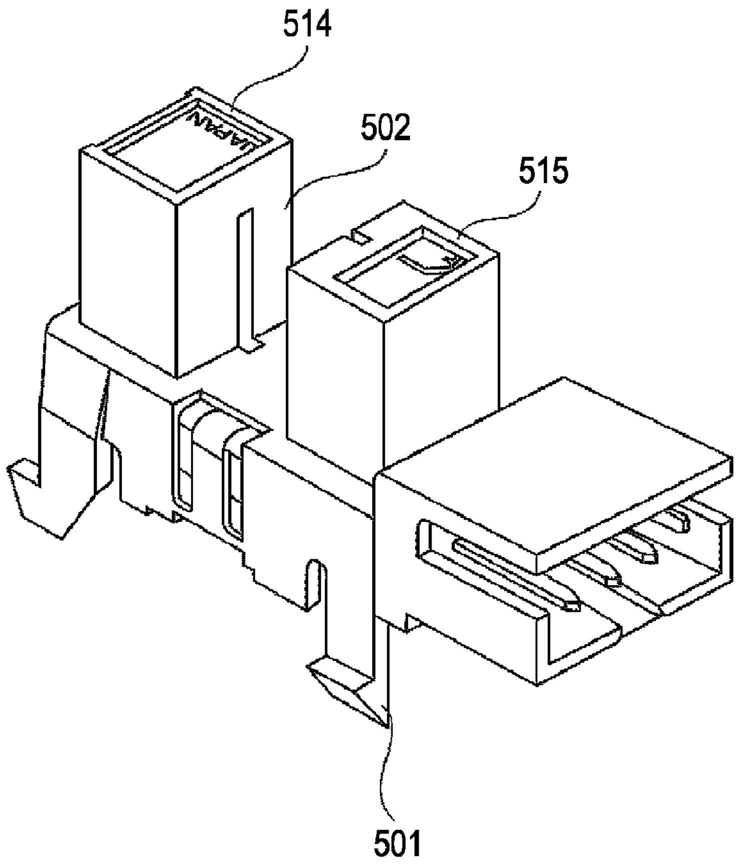
FIG. 8 is an external view of a conventional photo-interrupter.
Figure 9:
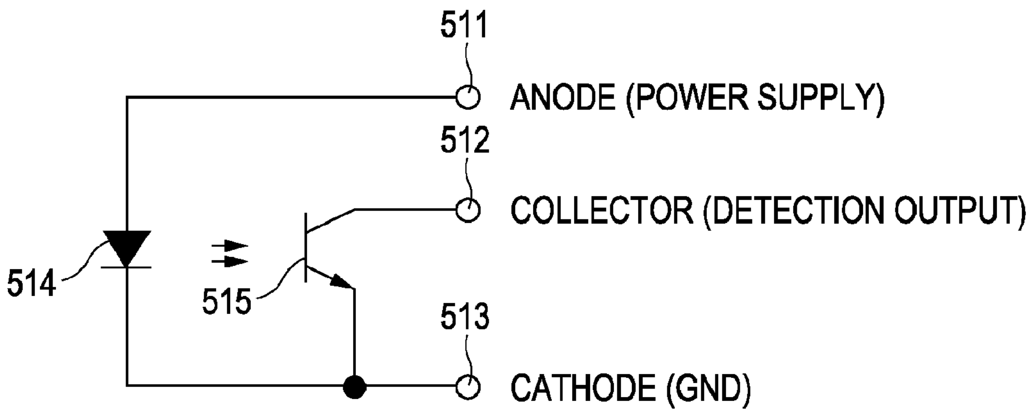
FIG. 9 is an internal circuit diagram of the conventional photo-interrupter.
Figure 10A:
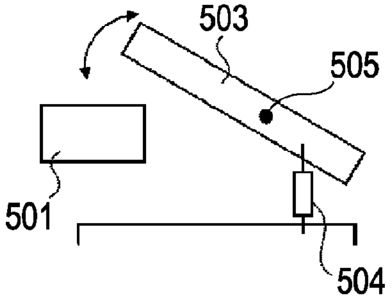
FIGS. 10A and 10B illustrate the detection mechanism of the conventional photo-interrupter.
Figure 10B:
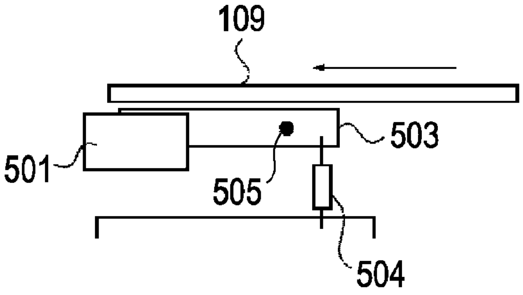
Figure 11:
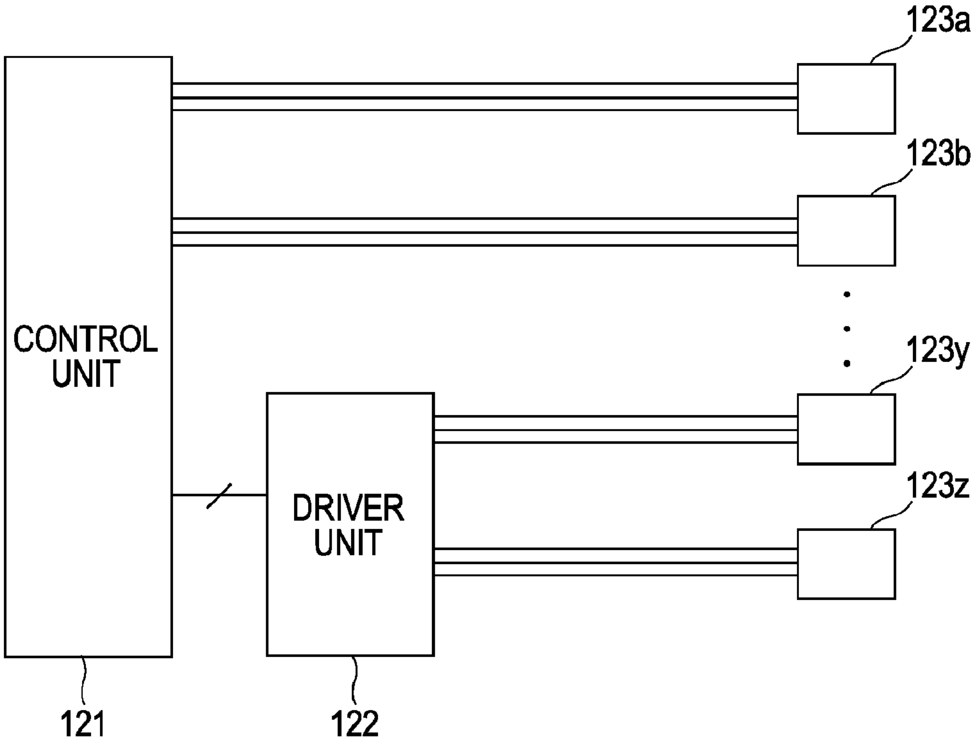
FIG. 11 is a control block diagram when the conventional photo-interrupter is used.

Referring to the block diagram of FIG. 7, only the information of the RFID detection sensor 101*aa* to be replaced is rewritten by the sending and receiving unit 110*b* of the image forming apparatus 300. In this case, during the rewriting, only the sending and receiving unit 110*b* and the RFID detection sensor 101*aa* to be replaced are electromagnetically connected together, so that an electromagnetic shielding member 124 is provided for electromagnetically shielding the other RFID detection sensors 101*a* to 101*z* from the sending and receiving unit 110*b*. The sending and receiving unit 110*b* is attached to and partially penetrates the electromagnetic shielding member 124, as shown in FIG. 7. When the electromagnetic shielding member 12 is attached to the sending and receiving unit 110*b* and is detected by a switch 113*b*, the rewriting is executed only by the sending and receiving unit 110*b* having the electromagnetic shielding member 124 attached thereto. Similarly, when the electromagnetic shielding member 124 is attached to the sending and receiving unit 110*a*, after a switch 113*a* detects that the electromagnetic shielding member 124 is attached, the rewriting is executed only by the sending and receiving unit 110*a*.

Thus, without rewriting the information of the other RFID detection sensors 101*a* to 101*z*, the information of only the target RFID detection sensor 101*aa* can be rewritten.

In the description above, the RFID detection sensors are provided in the image forming apparatus; alternatively, they may be provided in a sheet conveying apparatus, such as a stacker, a finisher, and a sorter, for detecting the presence of a sheet.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-162216 filed Jun. 12, 2006, which is hereby incorporated by reference herein in its entirety.

What is claimed is:

1. An image forming apparatus comprising:

an image forming unit configured to form images on a sheet;

a casing made of an electromagnetic shielding member;

a movable member configured to move from a position outside the casing to a position inside the casing upon contact of the sheet;

a radio communication device disposed on the movable member and configured to communicate via radio waves;

a sending and receiving unit configured to communicate via radio waves with the radio communication device;

a shielding member arranged on the movable member, configured to shield the radio communication between the radio communication device and the sending and receiving unit in a state that the movable member is located within the casing; and a controller configured to determine the presence of the sheet by determining whether the sending and receiving unit can communicate with the radio communication device, wherein an opening is provided on the casing, and the movable member covers the opening in response to being pushed by the sheet to be conveyed.

2. The image forming apparatus according to claim 1, wherein the radio communication between the radio communication device and the sending and receiving unit is enabled when the radio communication device is exposed outside the casing due to the movement of the movable member while the radio communication between the radio communication device and the sending and receiving unit is disabled when the radio communication device enters inside the casing.

3. The image forming apparatus according to claim 1, further comprising an antenna connected to the radio communication device, wherein the radio communication between the radio communication device and the sending and receiving unit is enabled when the antenna is exposed outside the casing due to the movement of the movable member while the radio communication between the radio communication device and the sending and receiving unit is disabled when the antenna enters inside the casing.

4. The image forming apparatus according to claim 1, wherein the radio communication device is operative due to radio electric power transmitted from the sending and receiving unit.

5. The image forming apparatus according to claim 1, wherein the image forming apparatus is provided with a plurality of the radio communication devices arranged therein, and the sending and receiving unit is capable of communicating with all of the radio communication devices in an initial state of the image forming apparatus.

6. The image forming apparatus according to claim 5, wherein in the initial state of the image forming apparatus, the controller confirms establishment of the radio communication between the radio communication devices and the sending and receiving unit.

7. The image forming apparatus according to claim 6, wherein the controller displays a warning on an operation panel when the radio communication device is incapable of establishing radio communication.

8. The image forming apparatus according to claim 1, wherein the image forming apparatus is provided with a plurality of the sending and receiving units arranged therein, and the controller establishes communication with the radio communication device by switching sendings from the plurality of the sending and receiving units in time sharing.

9. The image forming apparatus according to claim 1, wherein the radio communication device includes a memory, and the information stored in the memory to be transmitted to the sending and receiving unit includes the specific number of the image forming apparatus and the number of the radio communication device allocated in the image forming apparatus.

10. The image forming apparatus according to claim 9, wherein when the sending and receiving unit rewrites the information stored in the memory, the controller allows the sending and receiving unit to execute the rewriting such that a member for electromagnetically shielding radio communication with radio communication devices shields radio communication to all radio communication devices except for the radio communication device having a target memory to be rewritten.

* * * * *